Feb. 17, 1959 R. R. PITTMAN Re. 24,605
HIGH-VOLTAGE ARC-SPINNING ARRESTER
Original Filed May 31, 1950
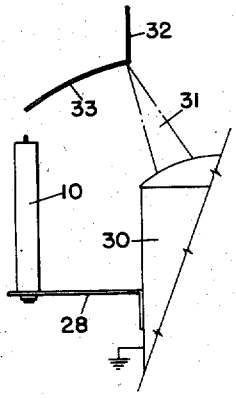
Fig. 7
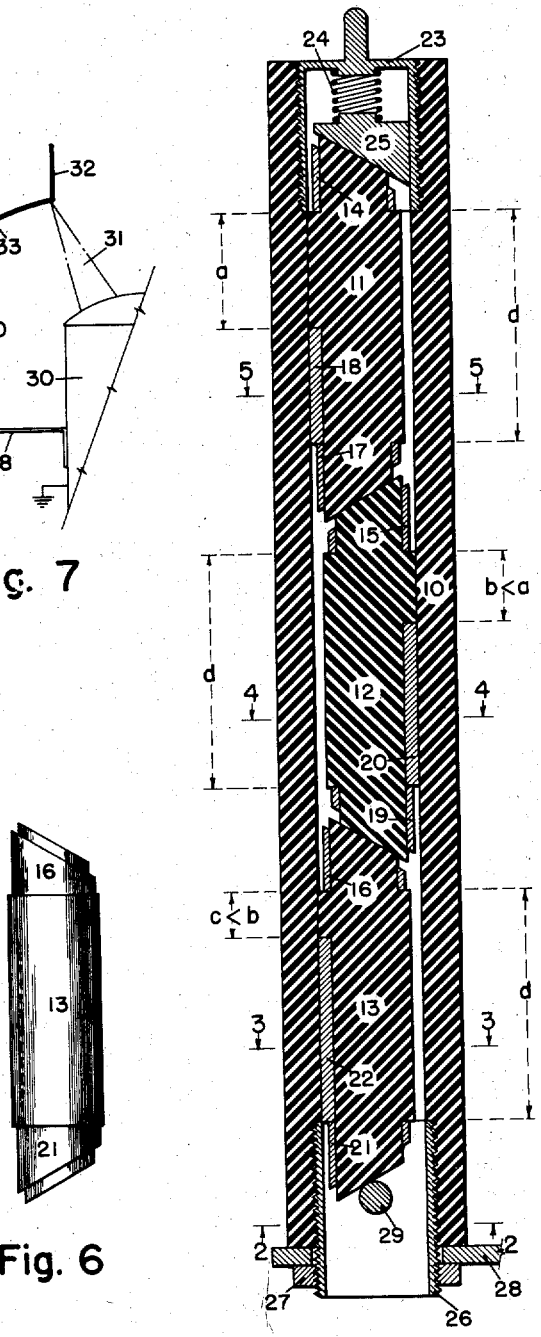
Fig. 1
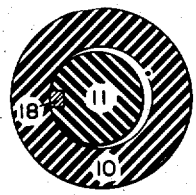
Fig. 5
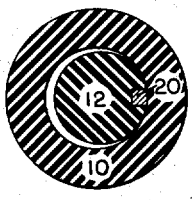
Fig. 4
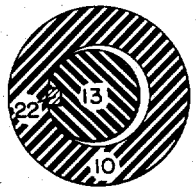
Fig. 3
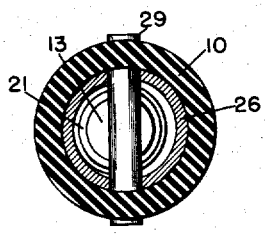
Fig. 2
Fig. 6
INVENTOR.
Raul R. Pittman United States Patent Office Re. 24,605
Reissued Feb. 17, 1959

24,605

HIGH-VOLTAGE ARC-SPINNING ARRESTER

Ralph R. Pittman, Pine Bluff, Ark.

Original No. 2,569,192, dated September 25, 1951, Serial No. 165,317, May 31, 1950. Application for reissue September 13, 1952, Serial 309,570

20 Claims. (Cl. 313—231)

Matter enclosed in heavy brackets [ ] appears in the original patent but forms no part of this reissue specification; matter printed in italics indicates the additions made by reissue.

The invention is a continuation in part of my application Serial No. 740,203, filed April 8, 1947, now abandoned, and relates to lightning arresters of the type adapted for the protection of electric power lines and connected apparatus from damaging effects of excessive superimposed voltages, such as may be caused by lightning or switching surges.

The objects of the invention include (a) the provision of a plural filler lightning arrester requiring at least two fillers in which the fillers may be made of the desired length to meet known operating conditions; (b) a construction in which the total filler length is not a design limitation in connection with high voltage circuits, as the number of fillers may be increased as may be necessary to meet circuit voltage conditions greatly in excess of the voltage which may be satisfactorily applied to a single filler device; and (c) the provision of a plural filler construction in which eccentrically positioned fillers are resiliently wedged against the inner surface of the tube along alternately peripherally spaced lines of abutment to provide an arc-spinning construction having a predetermined final arc position at extinguishment along each filler which differs both in length and position from the initiating sparkover path, the movement and elongation of the arc being facilitated by a favorable direction of movement of the conducting flame and gas from one filler to the next through the device so that greatly increased length of arc-extinguishing path per volt of protective voltage level is made available.

High voltage lightning arresters now available consist of a stacked series arrangement of separately housed units, structurally difficult to mount on apparatus. At the present time there are available no plural-filler lightning arresters of the arc-elongating expulsion type, to which the present invention is related. The voltage limitation in the application of this type of expulsion arresters has been principally a matter of maximum satisfactory length of filler. Single fillers are limited in length for several reasons; one is a material limitation, since long fiber fillers are susceptible to warping, either the filler or the associated tube may warp out of the initial position and cause failure of the arrester. Another reason for the limitation is strength of the insulating material when used as a long thin column. If too long with respect to diameter, lightning impacts may fracture the filler; if of sufficient diameter to withstand shock, cost of all the other elements increases too rapidly to enable devices so built to compete with other means of lightning protection. That the difficulties heretofore encountered in the construction of high voltage expulsion arresters of the arc-elongating type, which are inherent in long filler design, are overcome by the plural-filler design of the present invention will be apparent as the description proceeds.

With these and other objects in view which will appear from the description, my invention resides in the novel form, combination and construction of the parts of the device, and the scope of the invention will be indicated by the appended claims.

Fig. 1 of the drawing shows an elevational view of an embodiment of the invention, shown partly in section; Figs. 2, 3, 4 and 5 are respectively sectional views along the lines 2—2, 3—3, 4—4 and 5—5 of Fig. 1; Fig. 6 shows an elevation of a single filler and Fig. 7 illustrates an application of the invention to a piece of electrical apparatus.

Referring to Figs. 1 through 6, a hollow cylindrical tube of insulating material 10 is provided at its lower end with the conducting terminal electrode 26, the latter being hollow for the purpose of venting the tube to the atmosphere. The lower conducting rod 29 only partially closes the bore of the tube 10 and extends transversely across the lower portion of the tube 10 to provide a lower support for the stack of fillers within the tube.

The embodiment here presented illustrates a construction utilizing three fillers, 11, 12 and 13. From the description to follow, it will be apparent that two fillers is the minimum required to realize the advantages of the construction, and some number greater than two may be desired, depending upon the voltage of the circuit upon which the device is to be used. The fillers 11, 12 and 13 are conveniently formed from cylinders of insulating material of a diameter less than the internal diameter of the tube 10. The respective end portions of each filler is reduced in diameter, and the conducting ferrules 14 and 17 are press-fitted on the respective end portions of the upper filler 11, the conducting ferrules 15 and 19 are press-fitted on the respective end portions of the intermediate filler 12, and the conducting ferrules 16 and 21 are press-fitted on the respective end portions of the lower filler 13.

The upper and closed end filler 11 normally engages the vertical inner surface of the tube 10 along a vertical abutment line, and the conducting initiating electrode 18, in contact with the electrode 17, extends upwardly from the latter over a portion of the abutment line. Similiarly, the initiating electrode 20 extends upwardly from the electrode 19 of the intermediate filler, and the initiating electrode 22 from the electrode 21 of the lower and exhaust end filler. From the initiating-electrode sides of the respective fillers, the respective upper ends of the fillers are bevelled to slope outwardly and downwardly, and the respective lower ends are bevelled to slope outwardly and upwardly, so that when the separate fillers are sequentially dropped into the upper end of the tube with the initiating electrodes alternately peripherally spaced 180 degrees, the fillers naturally assume the positions shown in Fig. 1.

The upper end of the tube 10 is closed by threaded engagement with the end closure and line electrode 23. A spring 24 continuously and resiliently urges the stack of fillers in endwise direction against the lower terminal member 29, through the bevelled guide block 25, to normally maintain the desired end-to-end relationship, as well as the desired axial offset to provide the respective abutment line engagement, and maximum spacing from the inner wall along a line diametrically opposite the respective abutment lines. To provide a continuous gas passageway from the upper filler to the exhaust end of the tube, the fillers are preferably extended slightly beyond the associated end ferrules, which construction also avoids undesired welding of metal parts under conditions of heavy current discharge.

The tube and fillers should preferably be of some mechanically strong arc-resistive material; for example, hard fiber.

The path of lowest electrical strength through the device, as established by the relation of the conducting members, is from the line electrode 23 to the upper ferrule 14 of the closed end filler, thence along the abutment line from the ferrule 14 to the initiating electrode 18 and lower ferrule 17, thence from the latter to the upper ferrule 15 of the intermediate filler, thence along the abutment line from the ferrule 15 to the initiating electrode 20 and lower ferrule 19, thence from the latter to the upper ferrule 16 of the exhaust end filler, thence along the abutment line from the ferrule 16 to the initiating electrode 22 and ferrule 21, and thence to the lower or exhaust end electrode 26.

In operation, when a surge voltage of sufficient magnitude is expressed between the electrodes 23 and 26, sparkover occurs along the respective offset line-of-abutment gaps between the respective upper filler ferrules and the respective initiating electrodes, since the device is so constructd that the weakest electrical path is along the line-of-abutment gaps. The impact resulting from sparkover of the line-of-abutment gaps tends to drive each of the fillers away from its respective abutment line, and thereby lengthen the column of fillers. Any such tendency to lengthen is resisted by the spring 24, which immediately drives the fillers back to their original position when the surge is discharged. The gas accompanying surge discharge is initially conducting, and immediately upon formation discharges from the respective abutment lines endwise into the less restricted arc space of the offset and adjacent filler.

The initially conducting gas, in a three filler construction as here illustrated, which passes the closed end filler en route to the exhaust vent is less than that passing along any other filler. More conducting gas passes the intermediate filler than passes the closed end filler, and more conducting gas passes the exhaust end filler than passes the intermediate filler. Applicant believes that this is the explanation for the very favorable results obtained by his construction in actual practice, which makes possible the use of progressively shorter initiating gaps from the closed end to the open end of the device, while still retaining the desired spinning of the power arcs around each filler alternately from left to right and right to left, to thereby elongate and cool them to extinguishment by passing them over the relatively cold surfaces of the fillers and tube as they move to and elongate along the path of least restriction.

Whatever the explanation may be, I have found it possible with the construction illustrated to obtain a much higher ratio of final arc length to initial sparkover length than is possible in any single filler device, such as that described in Patent 2,164,720, dated July 4, 1939, and issued to the inventor herein. To illustrate, a construction suitable for extinguishing arcs on a 35,000 volt 60 cycle circuit operates satisfactorily with 1½″ initial abutment-line sparkover gap at the closed end filler, 1″ initial abutment-line sparkover gap at the itnermediate filler, and ¾″ abutment-line sparkover gap at the exhaust end filler. The length of the least restricted path along which arc extinguishment occurs is 3″ for each filler, yielding an elongation ratio at the closed end filler of 2 to 1, an elongation ratio at the intermediate filler of 3 to 1, and an elongation ratio at the exhaust end filler of 4 to 1. These results were obtained with a tube having as internal diameter of 1½″ and a filler diameter of 1⅜″. With the same tube and filler diameters, I have found that under actual service conditions, a construction is suitable for a 35,000 volt 60 cycle circuit, from the standpoint of arc spin and extinguishment, which employs 4 fillers having 1½″ initial at the upper two fillers and ¾″ initial at the lower two fillers, the length of the final and least restricted path in each case being 3″.

It is also likely that the evolved gas, as it moves from closed to open end, more tightly seals the abutment lines of the fillers adjacent to the exhaust end, thus better shielding the initiating electrodes, and preventing the retention of an arc along the initial sparkover path despite the fact that the voltage gradient becomes higher as the length of the initial sparkover path is decreased. In this connection, I have found the bevel at the filler ends is preferably not less than 30 degrees from the horizontal, and if desired may be at an angle greater than 30 degrees.

In the embodiment illustrated, the letter d shows the length of the final or least restricted arc paths along each filler, which in this case is the same for each filler. For proper operation of a single filler device, an initial sparkover path at the first filler may require a length designated by the dimension a. But when additional fillers are added between the closed end filler and the open end of the tube, the initial sparkover at these fillers may be progressively shortened, as indicated at b and c, without any adverse effect upon the operation of the device. In this manner the degree of protective margin is increased, because of the lower sparkover voltages made possible by the shorter initiating gaps, without any sacrifice of arc-extinguishing ability.

A method of applying the device is shown in Fig. 7. An electrode 33 extends to a point near the upper electrode of the device from the top of the insulating bushing 31 of the transformer 30, the line conductor 32 being connected to the top of the bushing. The device may be mounted upon a bracket 28, of conducting material, and fastened thereto by means of the nut 27. The metal tank of the transformer 30 is a grounded member, in accordance with common practice.

It will be apparent that the construction shown may be readily modified by simple changes to adapt the construction for use in protecting equipment operating at various circuit voltages, and it is intended that the drawing and description of the invention as here presented will be regarded as illustrative rather than limiting.

I claim, as my invention:

1. A lightning arrester construction comprising a tube of insulating material closed at one end and vented at the other end, normally insulated conducting electrodes mounted at the respective ends of said tube, a plurality of alternately axially-offset fillers of insulating material disposed within said tube in end-to-end abutting relationship, each of said fillers having a diameter less than the internal diameter of said tube, resilient means holding said fillers in alternately axially-offset positions to provide alternate diametrically opposed line-of-abutment engagement of alternate fillers with the inner surface of said tube, and structural means for causing sparkover between said conducting electrodes to occur within said tube and along a predetermined path which includes serially the diametrically opposed lines of abutment between said fillers and said tube, said structural means including a conducting member mounted on each filler and extending along the associated line of abutment for a distance less than the total length of said associated line of abutment, the conducting member associated with the filler adjacent to the closed end of said tube being shorter than the conducting members associated with any other filler.

2. A lightning arrester construction comprising a tube of insulating material closed at one end and vented at the other end, normally insulated conducting electrodes mounted at the respective ends of said tube, at least two alternately axially-offset fillers of insulating material, each having a diameter less than the internal diameter of said tube, positioned within said tube in end-to-end abutting relationship and in alternate diametrically opposed line-of-abutment engagement longitudinally along the inner surface of said tube, each of said fillers having an upper end surface sloping downwardly and outwardly and a lower end surface sloping upwardly and outwardly from its associated longitudinally extending line-of-abutment engagement, resilient means continuously urging said fillers in said end-to-end abutting engagement, and structural means for establishing within said tube and along the respective lines of abutment the path of lowest dielectric strength between said conducting electrodes, said structural means including a conducting member extending along the associated line of abutment of each filler for a distance less than the total length of said associated line of abutment, the length of said conducting members being such that the dielectric strength of the filler-tube abutment line associated with the filler at the closed end of said tube is greater than that of the other filler.

3. A lightning arrester construction comprising a tube of insulating material closed at one end and vented at the other end, normally insulated conducting electrodes mounted at the respective ends of said tube, a column of unjoined fillers of insulating material within said tube in end-to-end abutting engagement, each of said fillers having a diameter less than the internal diameter of said tube, said fillers being disposed in eccentric position with respect to the bore of said tube in engagement with the inner wall thereof along alternately peripherally spaced, longitudinally extending lines of abutment therewith, and providing a plurality of misaligned crescent-shaped, longitudinally extending discharge spaces originating at the abutment line of each filler and extending around each filler from one end to the other and between the outer surface of each filler and the inner surface of said tube, means including said electrodes for holding said fillers in said eccentric position, and structural means for causing sparkover between said electrodes to occur within said tube along a predetermined path which includes the peripherally spaced lines of abutment, said structural means including conducting members extending along a portion of the abutment line associated with each filler, the length of said conducting members being such that the ratio of the length of the dielectric portion of the abutment line of the filler adjacent to the closed end of said tube to the total length of said last-named filler is greater than said ratio with respect to any other filler.

*4. A lightning arrester comprising a plurality of metallic electrodes arranged in spaced relationship including a line electrode, a ground electrode and an intermediate electrode, said electrodes cooperating to provide a plurality of air gaps in series circuit relationship, a dielectric structure formed of arc extinguishing material comprising a tubular outer member closed at one end and vented at the other end, said intermediate electrode and said ground electrode being respectively disposed at the closed and vented ends of said tubular member, said intermediate electrode extending into said tubular member and functioning to establish electrical breakdown between said intermediate electrode and said ground electrode within said dielectric structure upon the occurrence of a surge between said line electrode and said ground electrode, a plurality of laterally offset cylindrical inner members extending in end-to-end relationship within and partially filling said tubular outer member, said inner members cooperating with the adjacent surface of said outer member to delineate a plurality of paths of travel for a plurality of serially related discharge arcs between the last-named electrodes, one of said paths being shorter than another and offering less resistance to insure the initial establishment of the discharge arcs therealong, another of said paths having a predetermined length substantially greater than said shorter path and forming a less restricted passage in which the discharge arcs are extinguished by the process of deionization, the establishment of the discharge arcs along said shorter path effecting the automatic transfer of the discharge arcs to said longer path through the increase in resistance to the continued flow of the discharge arcs along the initially established path of travel brought about through the action of the discharge arcs upon said dielectric structure.*

*5. A lightning arrester comprising a plurality of metallic electrodes arranged in spaced relationship including a line electrode, a ground electrode and an intermediate electrode, said electrodes cooperating to provide in series circuit relationship a first air gap between said line electrode and said intermediate electrode and a second air gap between said intermediate electrode and said ground electrode, and a dielectric structure formed of arc extinguishing material extending between said intermediate electrode and said ground electrode and including means for breaking said second air gap into a plurality of serially related air gaps, said dielectric structure defining a plurality of paths of travel for discharge arcs occurring along said plurality of serially related air gaps, a first of said paths being shorter than a second such path and offering less resistance to the initial establishment of the discharge arcs, the establishment of the discharge arcs effecting an increase in resistance along said first path of travel through the action of the discharge arcs upon the dielectric structure to divert the discharge arcs to the second path of travel which then has a lower resistance, said discharge arcs being extinguished by the process of deionization after they have been diverted to said second and longer paths.*

*6. A lightning arrester comprising a plurality of metallic electrodes positioned in spaced apart relationship to provide a plurality of air gaps arranged in series, and a dielectric structure formed of arc extinguishing material and confining at least two of said serially related air gaps, said dielectric structure including means defining a pair of separate paths of travel for discharge arcs along the confined air gaps, a first of said paths being shorter, partially restricted and offering less resistance to insure the initial establishment of the discharge arcs along said first path, a second of said paths being of a predetermined length substantially greater than said first path and providing a relatively unrestricted path in which the discharge arcs are extinguished by the process of deionization, the establishment of the discharge arcs along said first path effecting the automatic transfer of the discharge arcs to said longer path through the increased resistance to its continued flow along the initially established path resulting from the action of the discharge arcs upon the dielectric structure, which resistance reaches a magnitude greater than the resistance offered by said second path thereby causing the transfer of the discharge arcs to said second path wherein they are extinguished, and venting means for relieving internal pressure caused by the discharge arcs.*

*7. In a lightning arrester the combination of a pair of spaced apart electrodes, and dielectric structure formed of gas evolving, arc extinguishing material, said dielectric structure comprising a tubular outer member closed at one end and vented at the other end, said electrodes being respectively disposed at the closed and vented ends of the tubular member, a plurality of laterally offset cylindrical inner members disposed in end-to-end relationship within and partially filling said tubular outer member, said inner members cooperating with the inner surface of the outer tubular member to delineate a plurality of paths of travel for a plurality of serially related discharge arcs between the last-named electrodes, one of said paths being shorter than another and offering less resistance to insure the initial establishment of the discharge arcs therealong, another of said paths having a predetermined length substantially greater than said shorter path and forming a less restricted passage in which the discharge arcs are extinguished by the process of deionization, the establishment of the discharge arcs along said shorter path effecting the automatic transfer of the discharge arcs to said longer path through the increase in resistance to the continued flow of the discharge arcs along the initially established path of travel brought about through the action of the discharge arcs upon said dielectric structure.*

*8. In a lightning arrester the combination of a pair of spaced apart electrodes, and dielectric structure formed of gas evolving, arc extinguishing material extending between said electrodes, said dielectric structure including means defining a plurality of serially related air gaps between said electrodes and providing a plurality of paths of travel for discharge arcs occurring along said plurality of serially related air gaps, a first of said paths being shorter than a second such path and offering less resist-*

*ance to the initial establishment of the discharge arcs, the establishment of the discharge arcs effecting an increase in resistance along said first path of travel through the action of the discharge arcs upon the dielectric structure to divert the discharge arcs to the second path of travel which then has a lower resistance, said discharge arcs being extinguished by the process of deionization after they have been diverted to said second and longer paths.*

*9. In a lightning arrester the combination of a pair of spaced apart electrodes, and dielectric structure formed of gas evolving, arc extinguishing material extending between said electrodes, said dielectric structure including means defining a plurality of serially related air gaps between said electrodes and providing a pair of separate paths of travel for discharge arcs along the confined air gaps, a first of said paths being shorter, partially restricted and offering less resistance to insure the initial establishment of the discharge arcs along said first path, a second of said paths being of a predetermined length substantially greater than said first path and providing a relatively unrestricted path in which the discharge arcs are extinguished by the process of deionization, the establishment of the discharge arcs along said first path effecting the automatic transfer of the discharge arcs to said longer path through the increased resistance to its continued flow along the initially established path resulting from the action of the discharge arcs upon the dielectric structure, which resistance reaches a magnitude greater than the resistance offered by said second path thereby causing the transfer of the discharge arcs to said second path wherein they are extinguished.*

*10. The structure defined by claim 9 wherein venting means are provided for relieving internal pressure resulting from the gases evolved by the dielectric structure due to the action of the discharge arcs.*

*11. The structure defined by claim 4 wherein the individual gaps of said plurality of serially related air gaps are offset so that both of the paths of travel between said intermediate electrode and said ground electrode are tortuous.*

*12. The structure defined by claim 5 wherein the individual gaps of said plurality of serially related air gaps are offset so that both of the paths of travel between said intermediate electrode and said ground electrode are tortuous.*

*13. The structure defined by claim 6 wherein the individual gaps of said plurality of serially related air gaps are offset so that both of the paths of travel between said intermediate electrode and said ground electrode are tortuous.*

*14. The structure defined by claim 7 wherein the air gaps are offset so that both of the paths of travel between said electrodes are tortuous.*

*15. The structure defined by claim 8 wherein the air gaps are offset so that both of the paths of travel between said electrodes are tortuous.*

*16. The structure defined by claim 9 wherein the air gaps are offset so that both of the paths of travel between said electrodes are tortuous.*

*17. A lighting arrester comprising a plurality of metallic electrodes arranged in spaced relationship and including a line electrode, a ground electrode and an intermediate electrode, said electrodes cooperating to define a plurality of air gaps in series circuit relationship, a dielectric structure formed of gas evolving arc extinguishing material and including a substantially tubular outer member connected between said intermediate electrode and said ground electrode, means cooperating with said intermediate electrode to close one end of said outer member, means venting the other end of said outer member adjacent said ground electrode, said intermediate electrode extending into said one end of the outer member and functioning to establish electrical breakdown between said intermediate electrode and said ground electrode within said dielectric structure upon the occurrence of a surge between the line electrode and the ground electrode, said dielectric structure including a plurality of substantially cylindrical inner members extending in abutting end-to-end relationship within and partially filling said outer member, the abutting ends of said inner members being beveled to facilitate the end-to-end alignment of the inner members, an outer protective shield enclosing said dielectric structure, and said inner members including means cooperating with said outer member to define a plurality of paths of travel for the discharge between the intermediate electrode and the ground electrode resulting from the electrical breakdown, one of said paths of travel being shorter than another and offering less resistance to insure the initial establishment of the discharge therealong, said another path having a predetermined length substantially greater than said one path and forming a less restricted passage in which the discharge may be extinguished by the process of deionization, the establishment of the discharge along the shorter path effecting automatic transfer to the longer path through the increase in resistance along the initially established path brought about through the action of the discharge upon the dielectric structure.*

*18. In a lightning arrester the combination of first and second spaced apart metallic electrodes, a dielectric structure formed of gas evolving arc, extinguishing material and including a substantially tubular outer member connected between said electrodes, means cooperating with the first of said electrodes to close one end of said outer member, means venting the other end of said outer member adjacent the second of said electrodes, said first electrode extending into said one end of the outer member and functioning to establish electrical breakdown between said electrodes, said dielectric structure including a plurality of substantially cylindrical inner members extending in abutting end-to-end relationship within and partially filling said outer member, the abutting ends of said inner members being beveled to facilitate the end-to-end alignment of the inner members, an outer protective shield enclosing said dielectric structure, and said inner members including means cooperating with said outer member to define a plurality of paths of travel for the discharge between the electrodes resulting from the electrical breakdown, one of said paths of travel being shorter than another and offering less resistance to insure the initial establishment of the discharge therealong, said another path having a predetermined length substantially greater than said one path and forming a less restricted passage in which the discharge may be extinguished by the process of deionization, the establishment of the discharge along the shorter path effecting automatic transfer to the longer path through the increase in resistance along the initially established path brought about through the action of the discharge upon the dielectric structure.*

*19. A lightning arrester comprising a plurality of metallic electrodes arranged in spaced relationship and including a line electrode, a ground electrode and an intermediate electrode, said electrodes cooperating to define in series circuit relationship a first air gap between said line electrode and said intermediate electrode and a second air gap between said intermediate electrode and said ground electrode, and a dielectric structure formed of gas evolving arc extinguishing material and including a substantially tubular outer member extending between said intermediate electrode and said ground electrode to confine said second air gap, said dielectric structure including a plurality of substantially cylindrical inner members arranged in abutting end-to-end relationship within the outer member, the abutting ends of said inner members being beveled to facilitate their alignment within the outer member, and means on said inner members cooperating with the outer member to define a plurality of paths of travel for discharge resulting from electrical breakdown between the intermediate electrode and the ground electrode brought about by the occurrence of an*

*electrical surge between the line electrode and the ground electrode, a first of said paths of travel being shorter than a second such path and offering less resistance to the initial establishment of the discharge, the establishment of the discharge effecting an increase in resistance along said first path through the action of the discharge upon the gas evolving dielectric structure, thereby to divert the discharge to the second path of travel which has a lower resistance, said discharge being extinguished in said second path by the process of deionization of the evolved gases.*

*20. In a lightning arrester the combination of a pair of spaced apart metallic electrodes, a dielectric structure formed of gas evolving arc extinguishing material and including a substantially tubular outer member extending between said electrodes, said dielectric structure also including a plurality of substantially cylindrical inner members arranged in abutting end-to-end relationship within the outer member, the abutting ends of said inner members being beveled to facilitate their alignment within the outer member, said inner members including means cooperating with the outer member to define a*

*plurality of paths of travel for discharge resulting from electrical breakdown between the electrodes, a first of said paths of travel being shorter than a second such path and offering less resistance to the initial establishment of the discharge, the establishment of the discharge effecting an increase in resistance along said first path through the action of the discharge upon the gas evolving dielectric structure, thereby to divert the discharge to the second path of travel which has a lower resistance, said discharge being extinguished in said second path by the process of deionization of the evolved gases.*

References Cited in the file of this patent or the original patent

UNITED STATES PATENTS

| | | |
|---|---|---|
| 2,032,566 | Earle | Mar. 3, 1936 |
| 2,239,940 | Stroup | Apr. 29, 1941 |
| 2,334,727 | Roloson | Nov. 23, 1943 |
| 2,434,010 | Pittman | Jan. 6, 1948 |
| 2,453,719 | McFarlin | Nov. 16, 1948 |